(12) United States Patent
Rimmel

(10) Patent No.: US 11,319,979 B2
(45) Date of Patent: May 3, 2022

(54) SAFETY PUSH PIN

(71) Applicant: Matthew Rimmel, Northville, MI (US)

(72) Inventor: Matthew Rimmel, Northville, MI (US)

( * ) Notice: Subject to any disclaimer, the term of this patent is extended or adjusted under 35 U.S.C. 154(b) by 138 days.

(21) Appl. No.: 16/811,290

(22) Filed: Mar. 6, 2020

(65) Prior Publication Data
US 2021/0277925 A1 Sep. 9, 2021

(51) Int. Cl.
F16B 15/02 (2006.01)

(52) U.S. Cl.
CPC .................... F16B 15/02 (2013.01)

(58) Field of Classification Search
CPC .................. F16B 15/02; B43M 15/00
See application file for complete search history.

(56) References Cited

U.S. PATENT DOCUMENTS

| 1,857,158 | A | | 5/1932 | Maloney | |
|---|---|---|---|---|---|
| 2,885,168 | A | * | 5/1959 | Silverman | F16L 3/04 248/71 |
| 4,005,507 | A | * | 2/1977 | Yamazaki | B43M 15/00 24/351 |
| 6,276,030 | B1 | * | 8/2001 | Smith | B43L 9/24 24/710.4 |
| 6,311,404 | B1 | * | 11/2001 | Smith | B43L 9/24 33/27.02 |
| 7,004,703 | B2 | | 2/2006 | Johnson | |
| D852,885 | S | * | 7/2019 | Wang | D19/65 |
| 2008/0005873 | A1 | | 1/2008 | Barton | |
| 2010/0000057 | A1 | | 1/2010 | Wang | |
| 2010/0263174 | A1 | | 10/2010 | Aller | |

FOREIGN PATENT DOCUMENTS

| CN | 202826909 U | 3/2013 |
|---|---|---|
| CN | 107914501 A | 4/2018 |
| JP | 2000355194 A | 12/2000 |
| KR | 10-1132650 A | 3/2012 |

OTHER PUBLICATIONS https://www.jetpens.com/Kokuyo-Punyo-Punyo-Safety-Push-Pin-Pack-of-10/pd/7635, last accessed Feb. 22, 2020.
https://www.amazon.com/Acco-Assorted-Colored-Safety-Tacks/dp/B0787WPKBG/ref=pd_sbs_229_img_2/134-6837651-1719908?_encoding-UTF8&pd_rd_i=B0787WPKBG&pd_rd_r=12bea3a8-dee3-4fc5-b4cb-b9d8d78768ac&pd_rd_w=N49aP&pd_rd_wg=E1BIO&pf_rd_p=5cfcfe89-300f-47d2-b1ad-a4e27203a02a&pf_rd_r=MDCHJJ0N3FX4PBJE6QCJ&psc=1&refRID=MDCHJJ0N3FX4PBJE6QCJ last accessed Feb. 22, 2020.

* cited by examiner

Primary Examiner — Robert Sandy
Assistant Examiner — Rowland Do
(74) Attorney, Agent, or Firm — Diana D. Brehob; Brehob Law, PLLC

(57) ABSTRACT

A push pin, which has a position in which the pin is stowed to avoid unintended pin pricks and a fully-deployed position, is disclosed. The push pin includes: a main body with a trough and a pin, a pin body rotatably coupled to the main body; and a tension member coupled between the main body and the pin body. The tension member biases the pin body toward a stowed position in which the pin of the pin body is stowed in the trough of the main body. With a thumb-actuated nub on the pin body, the user of the push pin pushes against the tension member to rotate the pin body into the fully-deployed position for use. The tension member is an elastic loop in some embodiments and a torsion spring in other embodiments.

13 Claims, 10 Drawing Sheets

Prior art

SAFETY PUSH PIN

FIELD

The present disclosure relates to devices used to hang posters and the like from a penetrable, vertical surface. The devices are commonly referred to as push pins or thumb tacks.

BACKGROUND

It is common practice, particularly in classrooms, to hang posters, papers, displays, etc. on penetrable surfaces, such as cork boards. Decades ago, the practice was to use a standard thumb tack 20 as shown in FIG. 1. Because the standard thumb tack, when dropped on the floor, is likely to land with the pin sticking upward, push pins, as shown in FIG. 2, have largely displaced the usage of thumb tacks. In addition to the advantage that push pins are highly unlikely to land on the floor with the pin pointing upward, push pins have a further advantage of providing something on which to grasp to pull the pin out of the surface.

Although push pins address one concern about an errant pin dropping to the floor and potentially landing pin up that could be harmful for a person walking in the vicinity, the pin presents other concerns: hard to hold a handful of pins in one's hand, e.g., when up on a step stool to hang a high poster, without incurring pin pokes. Also, it is desirable to have a push pin that children could use in which the pin is stowed when not in use. Push pins, particularly in classrooms with very young children, can present a poking hazard for those children or particularly for younger siblings that might be visiting. Preventing curious young fingers from getting poked and/or accidentally poking each other is desirable.

One example of a thumb tack is shown in CN107914501, the figures of which are included here as FIG. 3 (undeployed) and FIG. 4 (deployed). In FIG. 3, a head 40 is coupled to a pin 44 and a ring 42. Ring 42 has a small orifice 46 through which the pin passes when deployed. In FIG. 4, pin 44 is shown penetrating surface 48 and ring 42 is shown in a deformed state. There are several disadvantages with the thumb tack of FIGS. 3 and 4. Because pins of thumb tacks or push pins are often bent during usage, it is a disadvantage to required that pin 44 passes through orifice 46 of ring 42. Also, ring 42 acts as a spring so that when pulled out of a penetrable surface, such as 48, that it returns to its undeployed state of FIG. 3. Spring tension in ring 42 when deployed acts to push against surface 48 thereby causing, at least in cases where there is little friction between pin 44 and surface 48, to pull out of surface 48, thereby defeating the purpose of the thumb tack.

In JP2000355194A, a tack 50 is shown in which the pin rotates 90 degrees about an axis. In FIG. 5, a body 52 has a part 54 for pressing tack 50. Body 52 also has two extensions 56 that form a notch 58 between extensions 56. In a stowed position, as shown in FIG. 5, a pin 60 (or alternately called a needle) that is coupled to body 52, is shown in a stowed position in which a sharp point of pin 60 is largely occluded by extensions 58. In FIG. 6, a cross section of FIG. 5, a stowed position of pin 60 is shown and a deployed position of pin 60, identified in phantom as 61, the positions between 90 degrees offset from each other. When usage is desired, pin 4 is rotated into a second position for deployment. Although JP2000355194A provides a way to occlude the pin when the tack is not in use, two hands are used to deploy the pin, which when hanging a poster may be very difficult. Furthermore, it is up to the user to stow the pin when not in use, something which cannot be counted on, particularly by young users.

A commercially-available tack, as shown in FIGS. 7 and 8, is spring loaded such that when not in use, pins 76 are stowed. Two body pieces 70 rotate with respect to each other around an axis 72. Body pieces 70 are coupled together around axis 72. Body pieces 70 further include finger-operated extensions 74. A torsion spring (not shown) is used to bias body pieces 70 into the stowed position, as shown in FIG. 7. When a force (shown as arrow 78) is applied on each of finger-operated extensions 74, the finger-operated extensions touch and deploy pins 76. FIG. 8 shows the deployed position, in which finger-operated extensions are pressed together to overcome the spring force of the torsion spring. When deployed, as shown in FIG. 8, pins 76 are deployed and ready for penetration into a penetrable surface (not shown). Pins 76 are automatically stowed when not in use. A disadvantage of having two pins is that to properly deploy the device, the pins should be parallel, otherwise the pins will not penetrate the surface readily and/or possibly put big holes in the surface. It may be difficult for some users, particularly young hands with limited strength or older hands with arthritis, to completely squeeze finger operated extensions 74 together to ensure that the pins are parallel. Additionally, it is well known to those who use push pins, tacks, and the like that the pins readily become bent. When one of the two pins is bent, the device of FIGS. 7 and 8 cannot be used for its intended purpose. The device in FIGS. 7 and 8 is pretty bulky and would cover up a fair bit of the wall hanging for display. This is not so much of a concern for a large poster. However, features in a small photograph may be occluded by the large surface area that the device in FIGS. 7 and 8 uses when deployed. The device of FIGS. 7 and 8 put two holes in the poster or picture to be displayed at each fastening point. This could present a disadvantage for some artwork in which a minimum of holes is desired.

SUMMARY

To overcome limitations in prior push pins, a push pin is disclosed that has a main body with a trough, a pin body rotatably coupled to the main body, and a tension member coupled between the main body and the pin body. The pin body has a pin extending outwardly. The tension member biases the pin body toward a stowed position in which the pin of the pin body is stowed in the trough of the main body.

The tension member is an elastic loop that is looped around an element on the main body and is looped around an element on the pin body.

The tension member is an elastic loop that is looped around the trough of the main body and is looped around the pin of the pin body.

The tension member is a torsion spring having a first end and a second end with the first end engaged with the main body and the second end engaged with the pin body.

The tension member is a torsion spring having a first wire section, a second wire section, and a helical section. The pin body has two coaxial axles. The helical section of the tension member is placed over one of the axles. The main body has a cavity defined therein. The first wire section extends into the cavity. The second wire section presses against the thumb-actuated nub.

A force applied to the thumb-actuated nub causes the pin body to rotate with respect to the main body and causes the torsion spring to unwind.

The pin body rotates with respect to the main body about a rotation axis. The tension member is a torsion spring that has a helical portion with a centerline of the helical portion aligned with the rotation axis. The torsion spring further includes a first end that extends outwardly from the torsion spring and engages with the main body. The torsion spring further includes a second end that extends outwardly from the torsion spring and abuts the pin body.

The pin body rotates with respect to the main body about a rotation axis and the pin body includes a thumb actuator nub that is offset from the rotation axis.

The pin body rotates with respect to the main body about a rotation axis. The main body has two cradles. The pin body has two axles extending outwardly therefrom with centerlines of the axles coaxial with the rotation axis and perpendicular with the pin of the pin body. A first of the two axles engages with a first of the two cradles and a second of the two axles engages with a second of the two cradles.

Also disclosed is a push pin that includes: a main body having a head with a central axis, a trough that extends outwardly in a direction substantially perpendicular to the central axis, and two cradles defined therein; a pin body having a pin, two axles, and a thumb-actuator nub; and an elastic loop looped around the trough and the pin. A first of the two axles snaps into a first of the cradles. A second of the two axles snaps into a second of the cradles. The elastic loop biases the pin body toward a stowed position in which the pin of the pin body is stowed in the trough of the main body.

The two axles are coaxial along a rotation axis and the thumb actuator nub is offset from the rotation axis.

The push pin is manufactured by: molding the main body; overmolding the pin body over a pin; snapping axles of the pin body into cradles of the main body; looping the elastic loop over the trough of the main body; and looping the elastic loop over the pin of the pin body.

Also disclosed is a push pin that includes a main body having: a head with a central axis, a trough that extends outwardly in a direction substantially perpendicular to the central axis, and two cradles defined therein; a pin body having: a pin, two axles, and a thumb-actuator nub; and a torsion spring having a helical portion, a first end, and a second end with the helical portion slipped over one of the two axles. The first end of the torsion spring engages with the main body. The second end of the torsion spring rests against the thumb-actuator nub. A first of the two axles snaps into a first of the cradles. A second of the two axles snaps into a second of the cradles. The torsion spring biases the pin body toward a stowed position in which the pin of the pin body is stowed in the trough of the main body.

The main body has a cavity defined in an underside of the main body. The first end of the torsion spring engages with the cavity.

The two axles are collinear along a rotation axis. The thumb actuator nub is offset from the rotation axis.

The first end of the torsion spring is straight. The second end of the torsion spring is hooked.

The first and second ends of the torsion spring are hooked.

The main body has a cavity defined in an underside of the head of the main body.

The push pin is manufactured by: molding the main body; overmolding the pin body over a pin; sliding the torsion spring over one of the two axles; and snapping axles of the pin body into cradles of the main body with a first end of the spring engaging with the cavity.

The push pins according to disclosures herein provide the following advantages: the pin is stowed in its stable state to protect from pin pokes; when deployed and pushed into a permeable surface, the force of the tension member is at 90 degrees to the surface so as not to push it out of the permeable surface; and the push pin has a head and an easily deployable thumb actuator nub.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 13:
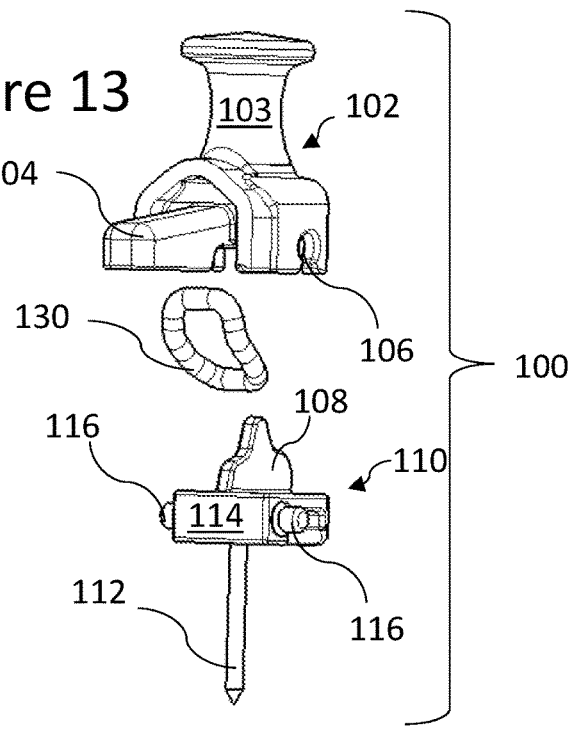

Referring to FIG. 13, an exploded view is shown of a push pin assembly 100 that has a main body 102, a pin body 110, and an elastic loop 130. Main body 102 has a head 103, a trough 104, and an opening that forms a cradle 106. Main body 102 has openings on each side for cradles 106, with one side not visible in FIG. 13. Head 108 is shown as the standard handle from prior art configurations that might be grasped between a thumb and forefinger to either install or remove a push pin from a penetrable surface for mounting posters, pictures, art work, etc. Pin body 110 includes a tab, a thumb actuator nub 114, an axle 116, and pin 112. Axles 116 of pin body 110 engage with cradles 106 of main body 102. Elastic loop 130, as will be shown in other figures, loops around an element of main body 102 and an element of pin body 110. Tension in elastic loop 130 biases pin 112 of push pin assembly toward a stowed position, i.e., a position in which pin 112 is housed in trough 104, as will be seen in other views.

Figure 1:
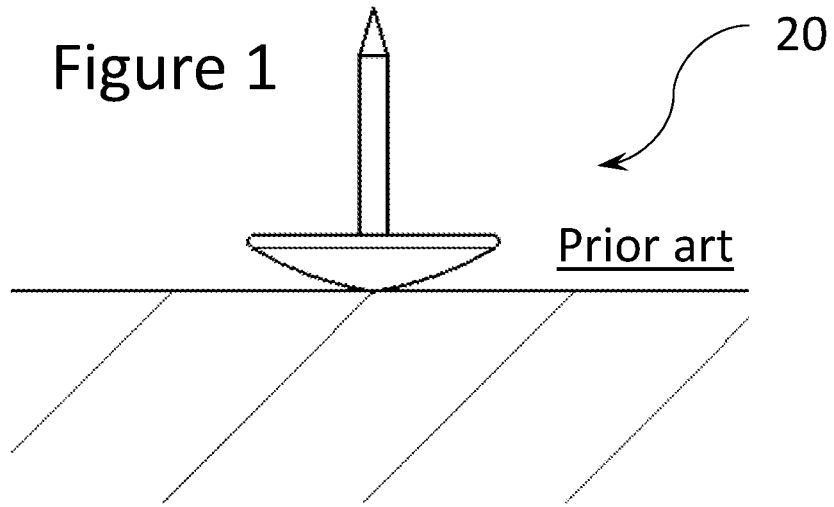
FIGS. 1-8 illustrate prior art tacks and/or push pins.
Figure 2:
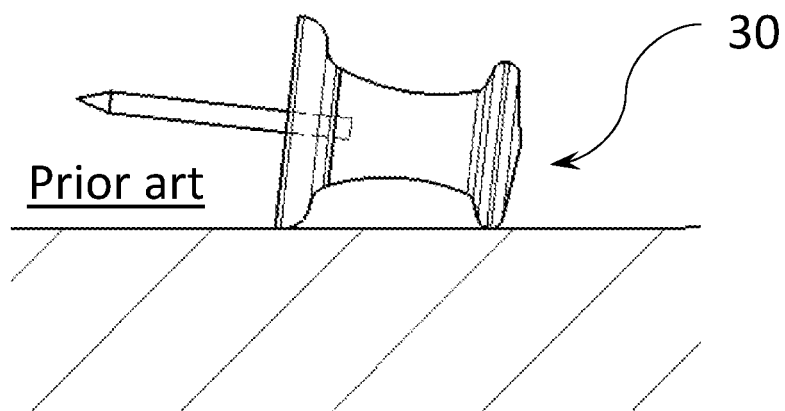
Figure 3:
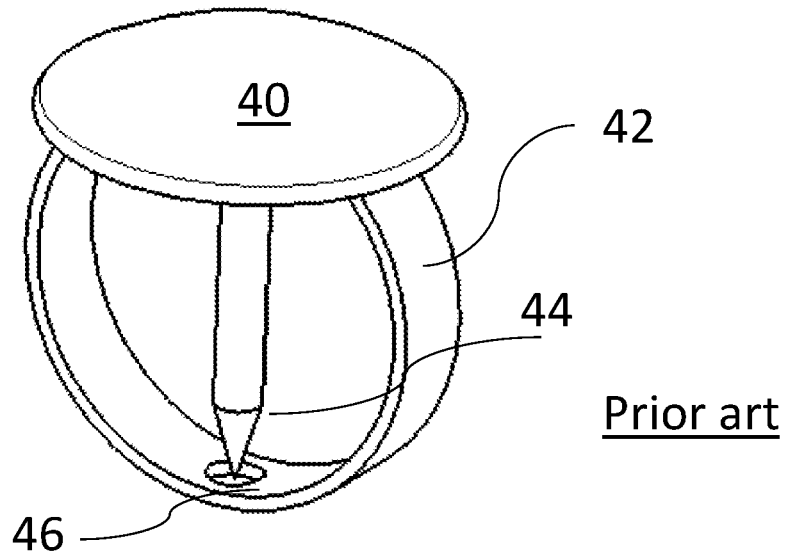
Figure 4:
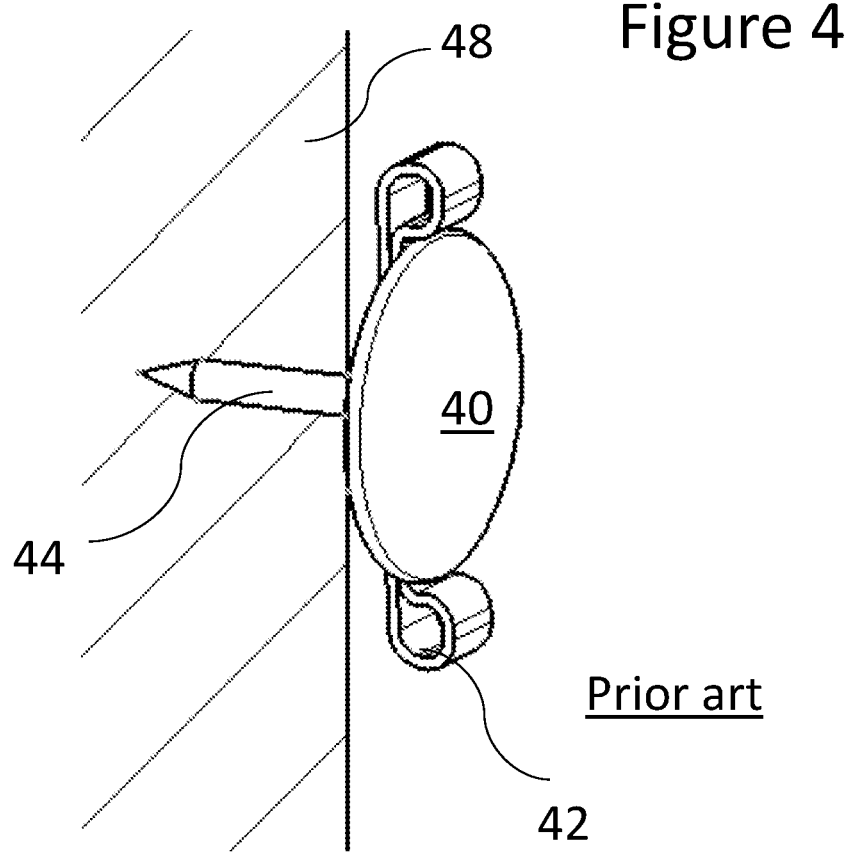
Figure 5:
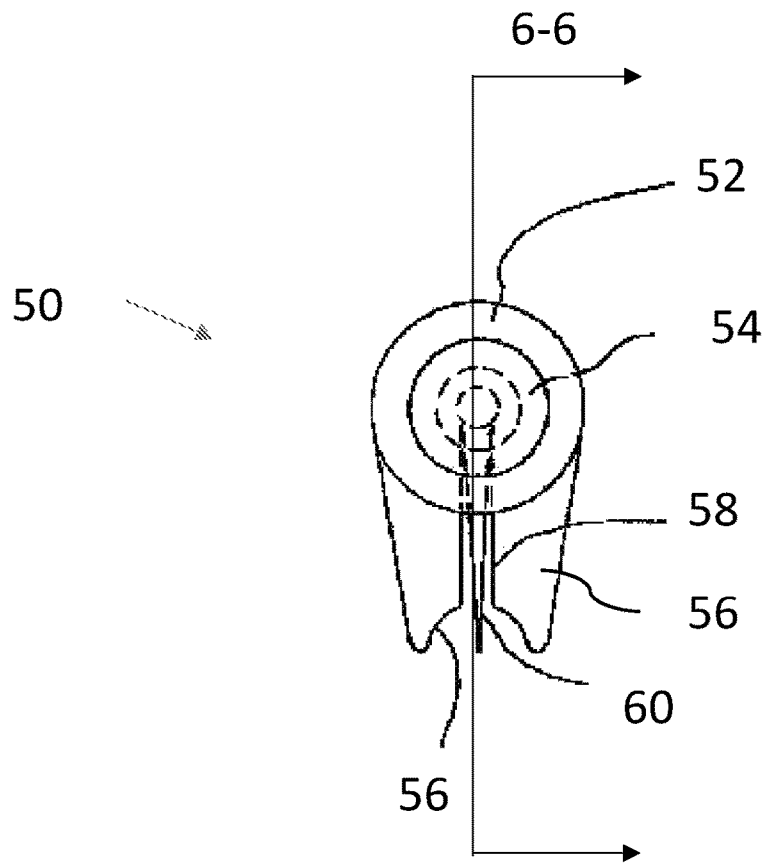
Figure 6:
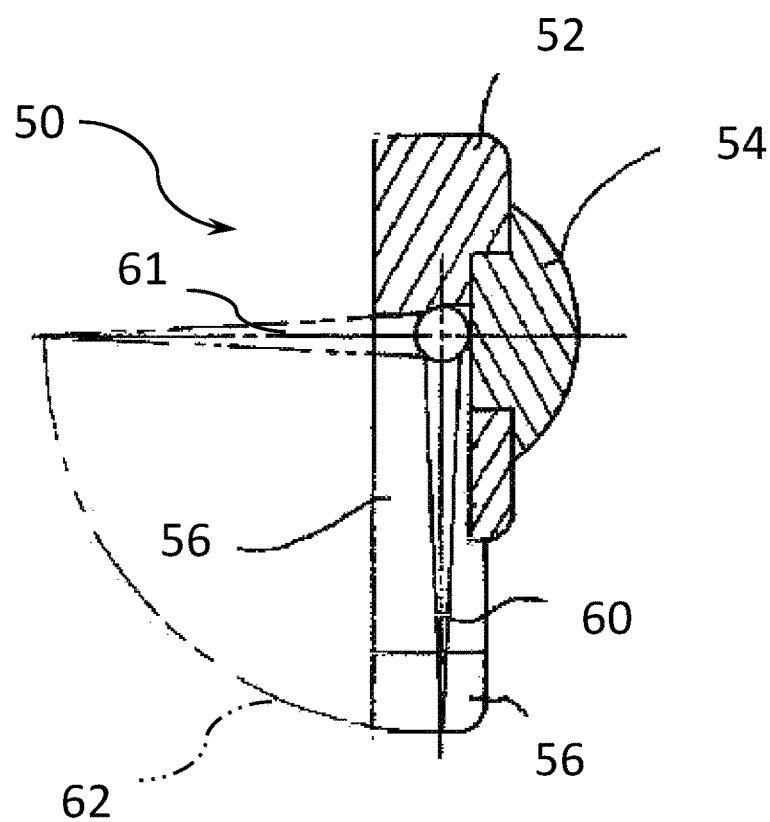
Figure 7:
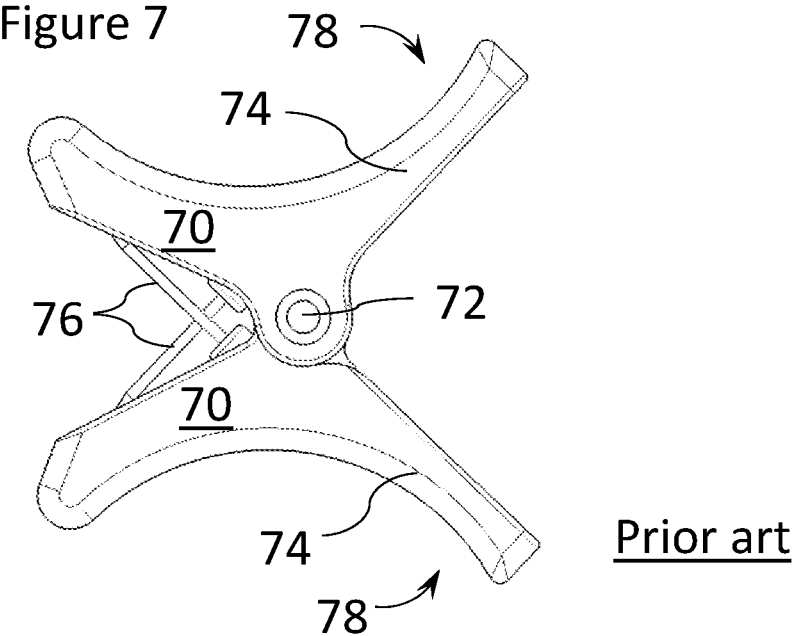
Figure 8:
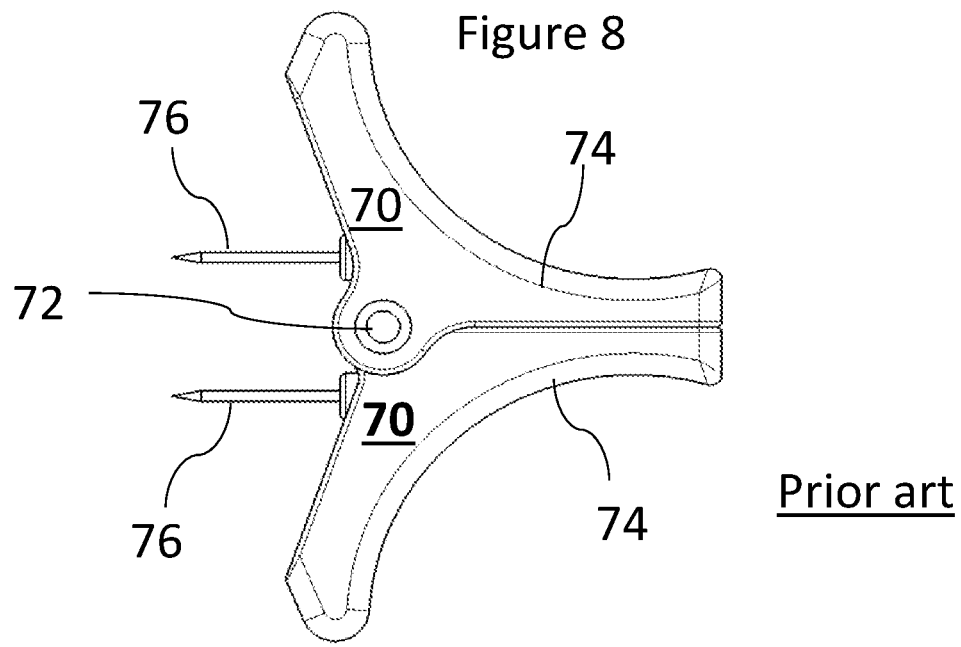
Figure 9:
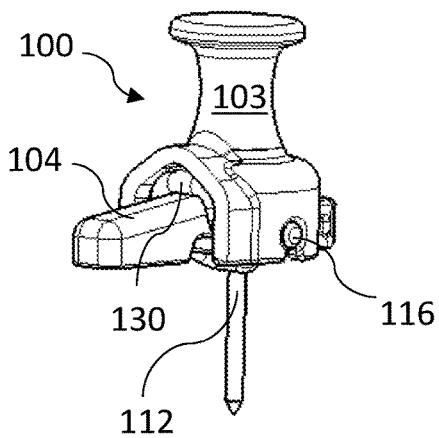
FIGS. 9-13 show a push pin according to an embodiment of the present disclosure in: isometric, plan, side, underside, and exploded views, respectively.

In FIG. 9, push pin assembly 100 is shown in an isometric view and as assembled. In FIG. 9, pin 112 is in the fully-deployed position. The cradle of main body 102 is not separately called out as axle 116 of pin body 110 is engaged into the cradle. Elastic loop 130 is shown wrapped around trough 104.

Figure 10:
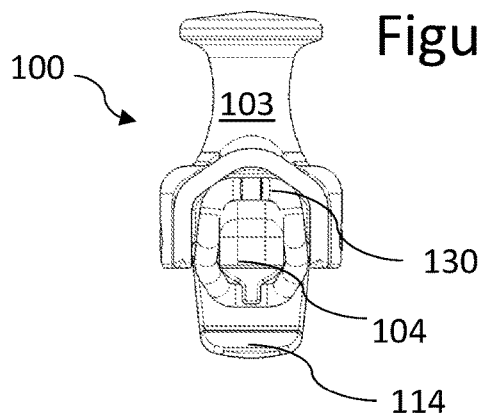
Figure 12:
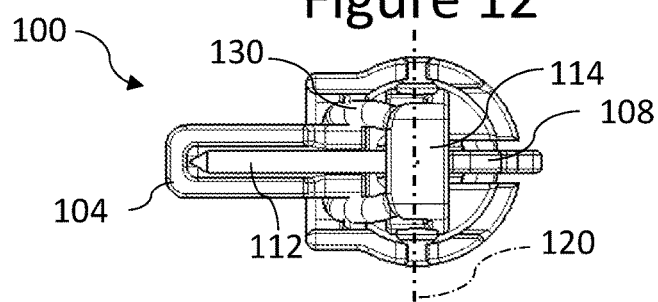

In FIG. 10, an end view of push pin assembly 100 is shown in which pin 112 is not visible because it is in its stowed position. Elastic loop 130 is shown wrapping around trough 104. In FIG. 12, a bottom view with pin 112 stowed in trough 104 is shown.

Figure 11:
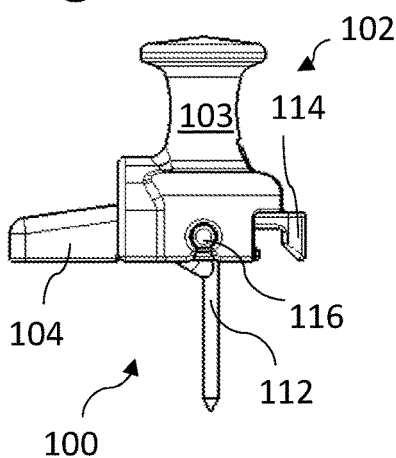

A side view of push pin assembly 100 shows thumb actuator nub 114 extending out from main body 102 is shown in FIG. 11 with pin 112 fully deployed.

Figure 14:
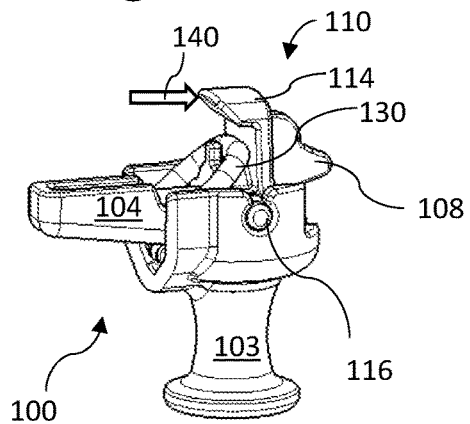
FIGS. 14-16 illustrate the push pin of FIGS. 9-13 in three isometric views: a stowed position, a partially-deployed position, and a fully-deployed position, respectively.
Figure 15:
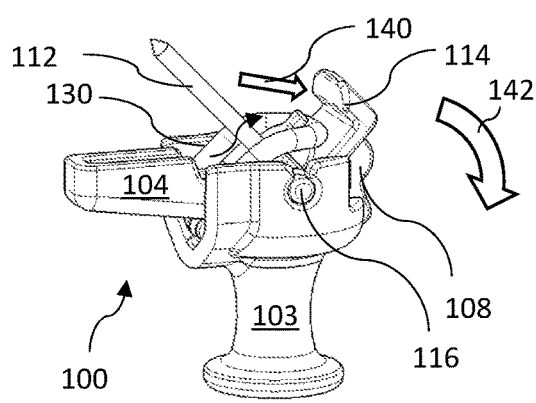
Figure 16:
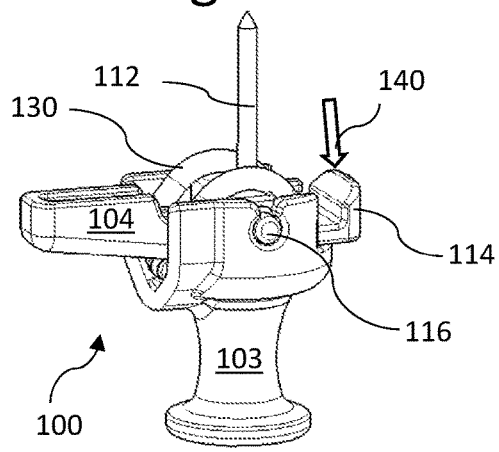

In FIGS. 14, 15, and 16, push pin assembly 100 is shown in its stowed, partially deployed, and fully deployed configurations. In FIG. 14, force, as indicated by an arrow 140 has yet to be applied to cause pin body 110 to rotate. The pin of pin body 110 is not visible as it is stowed in trough 114. In FIG. 15, the force 140 on thumb actuator nub 114 has caused pin body 110 to rotate, as indicated by arrow 142, with respect to the main body (one part of which is head 103). With continued pushing on thumb actuator nub 114, illustrated as arrow 140, pin 112 becomes fully deployed, as shown in FIG. 16. Force (arrow 140) is continually applied to maintain pin 112 in its fully deployed position. In practice, push pin assembly 100 is then pressed into a penetrable surface (not shown). At that point, the penetrable surface causes acts against the spring tension of elastic loop 130 and maintains pin 112 in the deployed state with no further force being applied.

Figure 17:
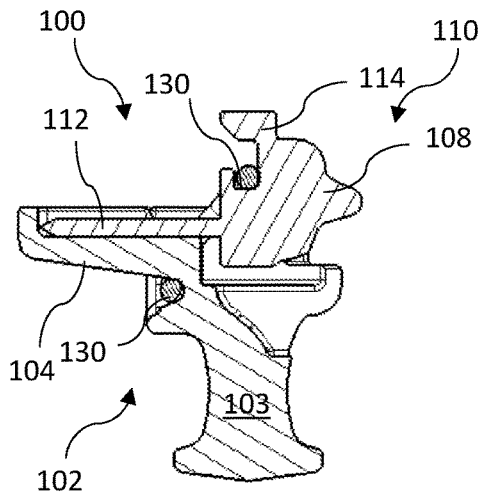
FIG. 17 shows the push pin of FIGS. 9-16 in cross section.

A cross-sectional view of push pin assembly 100 is seen in FIG. 17. Main body 102 is shown with a cross hatch going from upper left to lower right. Pin body 110 has a cross hatch going from upper right to lower left. Elastic loop 130 is shown in the two places with a cross hatch that is much tighter than either of pin body 110 or main body 102.

Figure 18:
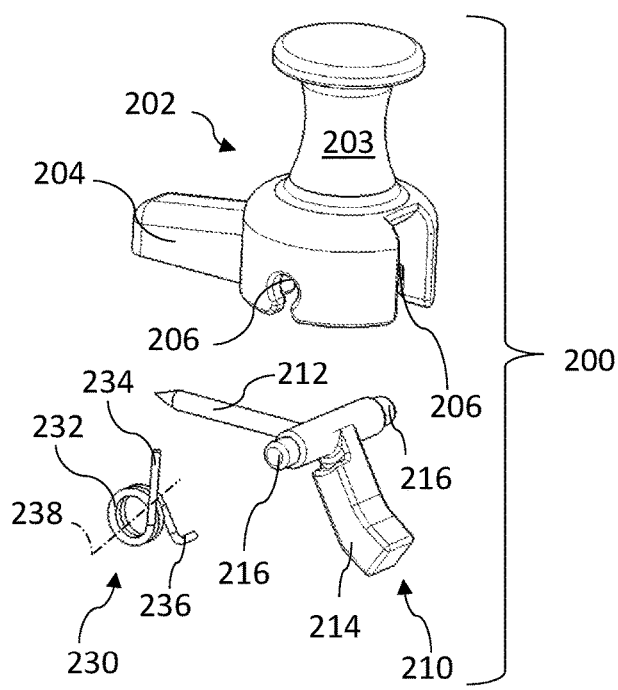
FIGS. 18-20 show isometric views of a push pin according to an embodiment of the present disclosure completely exploded, partially assembled, and fully assembled positions, respectively.
Figure 19:
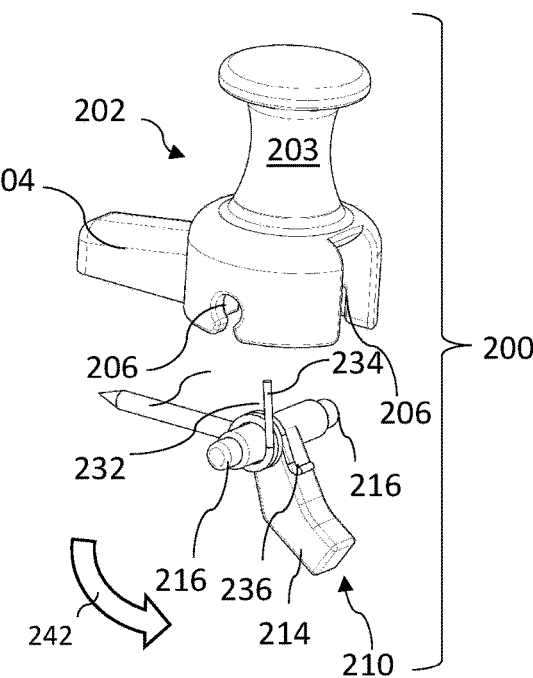
Figure 20:
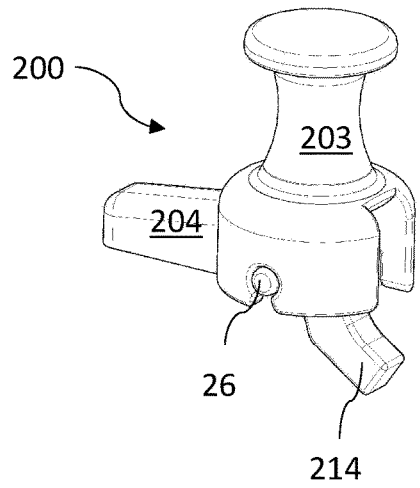

An alternative embodiment of a push pin 200 is shown in FIGS. 18-23. Referring to FIG. 18, push pin 200 is shown in an exploded view. A main body 202 has a head 203, a trough 204 extending out one side and two openings that serve as cradles 206. Push pin 200 also has a pin body 210 that has a thumb-actuated nub, two axles 216, and a pin 212. Push pin 200 has a torsion spring 230 with a helical section 232, a straight section 234 extending out one end of helical section 232, and a hook section 236 extending out the other end of helical section 232. In other embodiments, torsion spring 230 has straight sections extending from both ends, hook sections extending from both ends, and any other suitable combination. A central axis 238 of torsion spring 230 is also illustrated in FIG. 18. In FIG. 19, torsion spring 230 is assembled onto pin body 210 with the central axis 238 (not separately shown in FIG. 19) aligning with centerlines, or axis of rotation, of axles 216. In FIG. 20, push pin 200 is fully assembled with axles 216 snapped into cradles 206.

Figure 21:
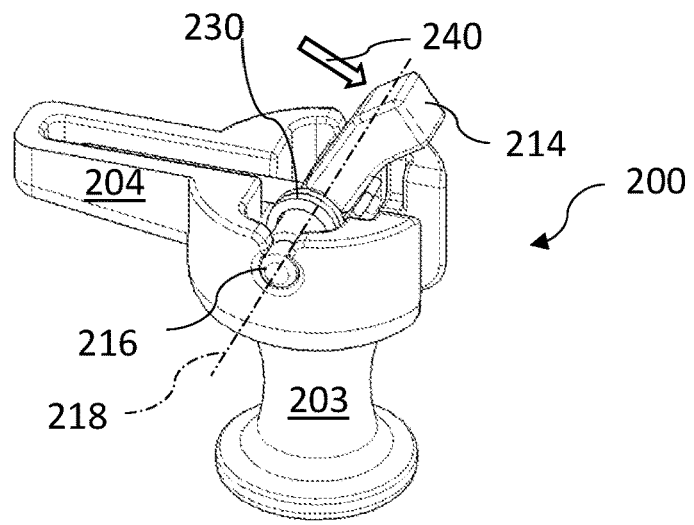
FIGS. 21-23 illustrate the push pin of FIGS. 18-20 in three isometric views: a stowed position, a partially-deployed position, and a fully-deployed position, respectively.
Figure 22:
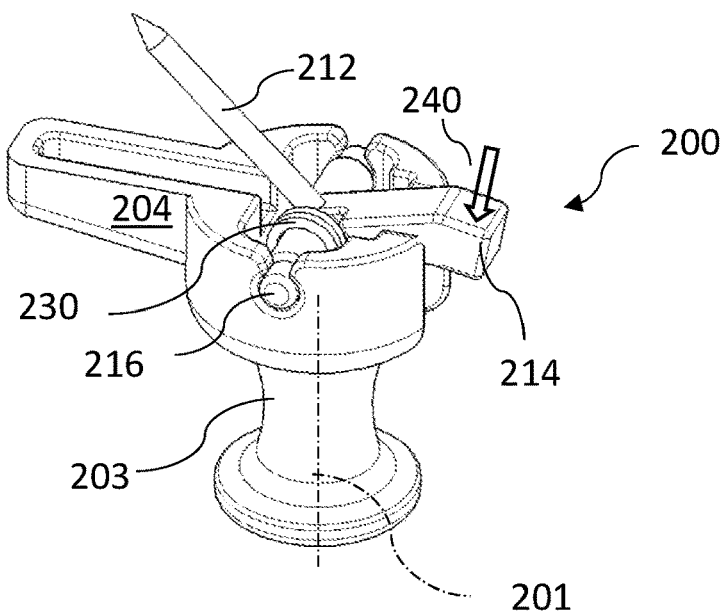
Figure 23:
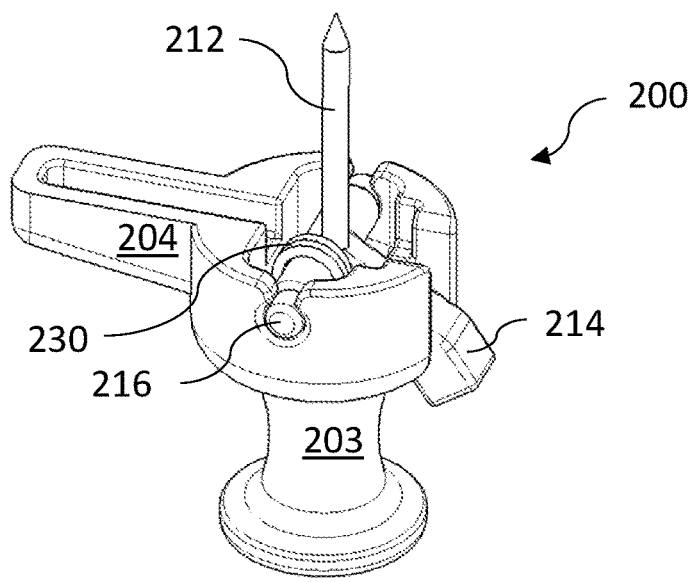

In FIG. 21, push pin 200 is shown with head 203 pointing downward and in an isometric view to see the working parts of push pin 200. FIG. 21 shows the stowed position in which the pin (not visible) is stowed in trough 204. Thumb-actuated nub 214 is shown in its neutral position. Although when a force 240 is applied on 214, pin body 210 (not separately called out in FIG. 21) starts to rotate with respect to main body 202 (also not separately called out in FIG. 21). When force 240 is applied against torsion spring 230, torsion spring 230 unwinds and provides some resistance because torsion spring 230 wants to return to its neutral position; and pin body 210 rotates around a central axis 218. After some rotation of pin body 210, a partially deployed position is shown in FIG. 22, in which pin 212 is no longer stowed in trough 204, yet not fully deployed. A continuing force 240 application to thumb-actuated nub 214 causes the pin body 210 to get into the fully-deployed position, as shown in FIG. 23. A stop (not shown) prevents pin body 210 from rotating further than the fully-deployed position. In one embodiment, thumb-actuated nub 214 hits the stop. Any suitable combination of an element on pin body 210 and a corresponding element on main body 202 can be provided to serve as a stopping feature.

In FIG. 22, a central axis 201 of head 203 is shown. Trough 20 extends out from pin body 210 in a direction substantially perpendicular to central axis 201.

Figure 24:
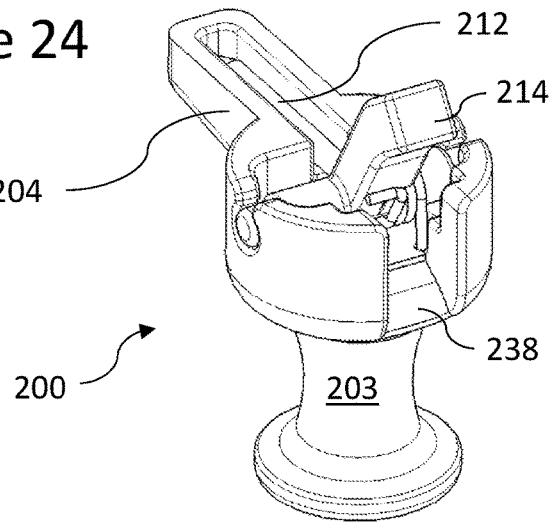
FIG. 24 is an isometric, underside view of the push pin of FIGS. 18-23.

The pin body is allowed to rotate with respect to the main body between the stowed position, which the pin is hitting the bottom of the trough and to a fully-deployed position when a central axis of the pin is substantially collinear with an axis of the head of the main body. So that these two axes are collinear when the push pin is fully deployed, a stop is employed so that the pin body is prevented from rotating past the fully-deployed position. An additional view of the embodiment shown in FIGS. 18-23 in FIG. 24 shows push pin 200 with pin 212 stowed in trough 204. Thumb-actuator nub 214 is shown displaced from a stop 238. When a force is applied to thumb-actuator nub 214 and the pin body rotates, thumb-actuator nub 214 will contact stop 238 to prevent further rotation. In such a manner, stop 238 prevents the pin body to over-rotate beyond the full-deployed position in which the central axis of pin 212 is substantially parallel with the central axis of head 203.

Figure 25:
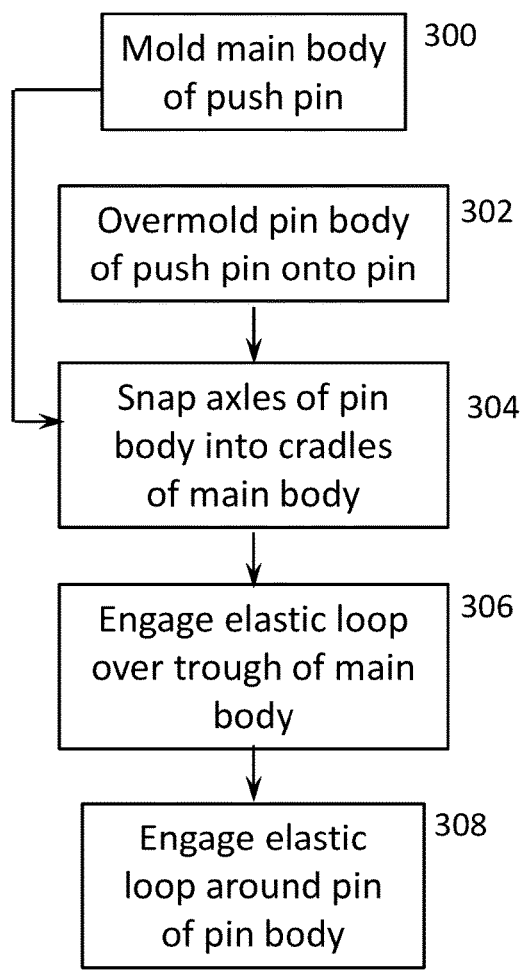
FIG. 25 is a flowchart showing an embodiment of processes involved in manufacturing a push pin having an elastic loop.

Referring now to FIG. 25, a set of processes to manufacture a push pin are shown. In block 300, the main body of the push pin is molded. In block 302, the pin body of the push pin is molded over a pin. Block 300 and 302 can be performed in any order. Blocks 300 and 302 could apply to plastic, injection molding. In an alternative embodiment, the main body and/or the pin body are made of a metal and the pin might be molded with the pin body.

In block 304, the two parts molded in blocks 300 and 302 are assembled by snapping axles of the pin body into the cradles of the main body. In blocks 306 and 308, the elastic loop is installed by engaging the loop over the trough of the main body and engaging over the pin of the pin body. Blocks 306 and 308 can be done in either order.

Figure 26:
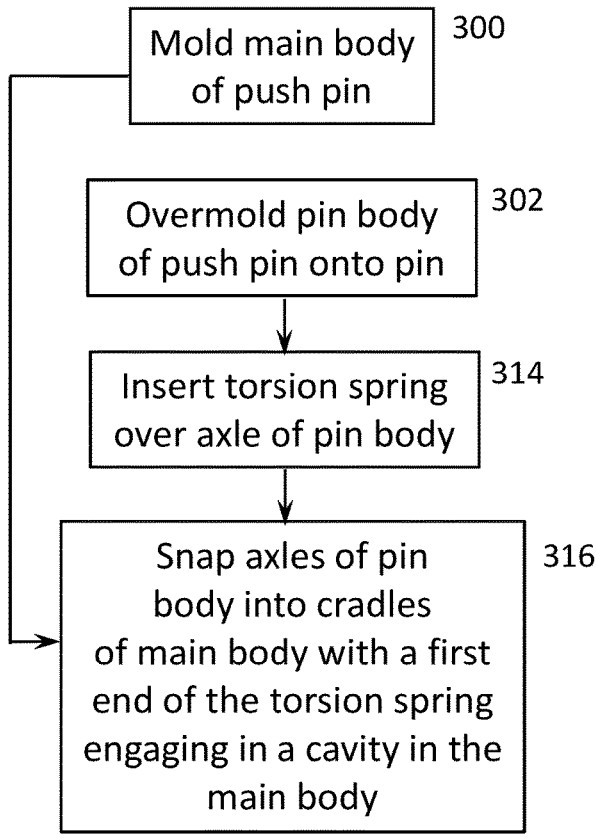
FIG. 26 is a flowchart showing an embodiment of processes involved in manufacturing a push pin having a torsion spring.

Referring now to FIG. 26, assembly of an embodiment having a torsion spring is shown. Blocks 300 and 302 use the same processes as those described in regard to FIG. 25, although the molds are different between the two embodiments. In block 314, the torsion spring is installed over the axle of the pin body. In block 316, the main body of block 302 and the pin body with the torsion spring of block 314 are snapped together. The end of the torsion spring with a straight end (element 234 of FIG. 19) of the torsion spring engaging with a cavity defined within the main body during the assembly. Referring back to FIG. 19, it can be seen that hook portion 236 of torsion spring 230 sits against one side of thumb actuator nub 214. When pin body 210 rotates with respect to the main body 202 in a direction as shown by arrow 242, the torsion spring unwinds. Hook portion 236 is pushed by thumb-actuator nub 214 while straight portion 234 remains captive within the cavity (not visible) inside of head 203. The torsion spring is biased to return to its neutral position and thus unless a force is applied to cause pin body to rotate in the direction of arrow 242, pin body moves toward the stowed position.

Figure 27:
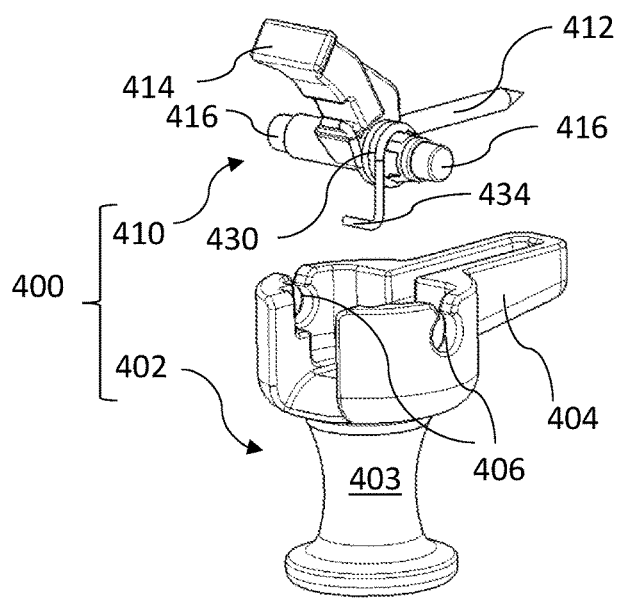
FIGS. 27-30 show an embodiment of the push pin in: an exploded isometric view, an assembled isometric view, a cross-sectional view, and a blow up of a portion of the cross-section view.
Figure 28:
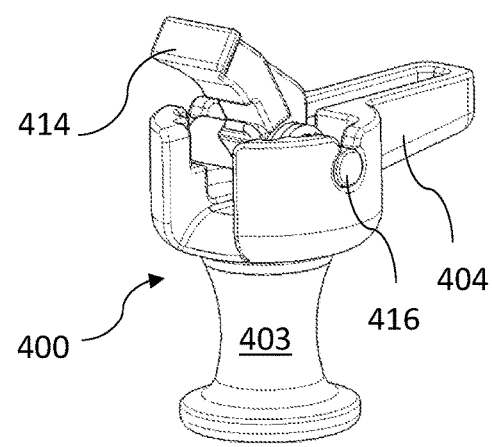
Figure 29:
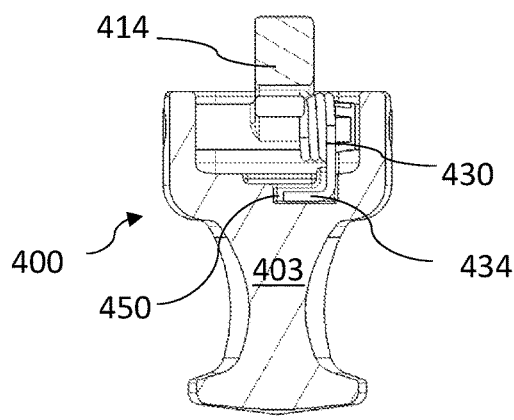
Figure 30:
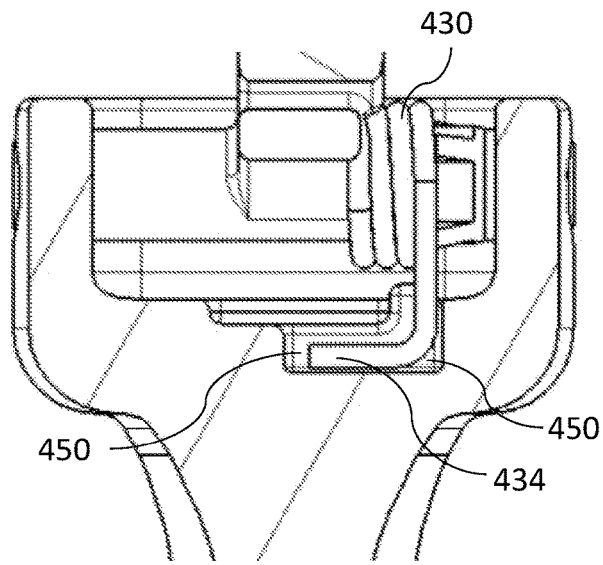

In a slight variation, a push pin 400 is shown exploded in FIG. 27. Push pin 400 has a pin body 410 and a main body 402. Pin body 410 has a pin 412. Main body 402 includes a trough 404 into which pin 412 can be stowed. Main body 402 has a head 403, cradles 406. Pin body has with a torsion spring 430 slid over one of the two axles 416. Pin body further includes a thumb-actuator nub 414. Torsion spring has an end 434 that is bent. Main body 402 has cradles 406 provided for axles 416. Push pin 400 is shown assembled and in the state with the pin stowed in FIG. 28. Push pin 400 is show in cross section in FIG. 29 in which the hook 434 of torsion spring 430 is inserted into cavity 450. In FIG. 30, a blow up of a portion of FIG. 28 is shown so that hook 434 of torsion spring 430 and cavity 450 are more easily viewed.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

I claim:

1. A push pin, comprising:
a main body having a trough;
a pin body rotatably coupled to the main body; and
a torsion spring coupled between the main body and the pin body, wherein:
the pin body has a pin extending outwardly, two coaxial axles, and a thumb-actuated nub;
the torsion spring biases the pin body toward a stowed position in which the pin of the pin body is stowed in the trough of the main body;
the torsion spring has a first wire section, a second wire section, and a helical section;
the helical section of the torsion spring is placed over one of the two coaxial axles;
the main body has a cavity defined therein;
the first wire section extends into the cavity; and
the second wire section abuts the thumb-actuated nub.

2. The push pin of claim 1, wherein:
the pin body rotates with respect to the main body about a rotation axis;
the torsion spring has a helical portion with a centerline of the helical portion aligned with the rotation axis;
the first wire of the torsion spring extends outwardly from the torsion spring and engages with the main body; and
the second wire of the torsion spring extends outwardly from the torsion spring and abuts the pin body.

3. The push pin of claim 1, wherein:
the pin body rotates with respect to the main body about a rotation axis; and
the thumb actuated nub is offset from the rotation axis.

4. The push pin of claim 1, wherein:
the pin body rotates with respect to the main body about a rotation axis;
the main body has two cradles;
the pin body has two axles extending outwardly therefrom with centerlines of the axles coaxial with the rotation axis and perpendicular with the pin of the pin body; and
a first of the two axles engages with a first of the two cradles and a second of the two axles engages with a second of the two cradles.

5. A push pin, comprising:
a main body having a trough;
a pin body rotatably coupled to the main body; and
a torsion spring coupled between the main body and the pin body, wherein:
the pin body has a pin extending outwardly and a thumb-actuated nub;
the torsion spring biases the pin body toward a stowed position in which the pin of the pin body is stowed in the trough of the main body; and
a force applied to the thumb-actuated nub causes the pin body to rotate with respect to the main body and causes the torsion spring to unwind.

6. The push pin of claim 5, wherein:
the pin body rotates with respect to the main body about a rotation axis;
the main body has two cradles;
the pin body further comprises two axles;
the two axles of the pin body extend outwardly therefrom with centerlines of the axles coaxial with the rotation axis and perpendicular with the pin of the pin body; and
a first of the two axles engages with a first of the two cradles and a second of the two axles engages with a second of the two cradles.

7. The push pin of claim 5, wherein:
the pin body rotates with respect to the main body about a rotation axis;
the torsion spring has a helical portion with a centerline of the helical portion aligned with the rotation axis;
the torsion spring further includes a first end that extends outwardly from the torsion spring and engages with the main body; and
the torsion spring further includes a second end that extends outwardly from the torsion spring and abuts the pin body.

8. The push pin of claim 5, wherein:
the pin body rotates with respect to the main body about a rotation axis; and
the thumb actuated-nub is offset from the rotation axis.

9. The push pin of claim 5, wherein the torsion spring biases the pin body toward a stowed position in which the pin of the pin body is stowed in the trough of the main body.

10. A push pin, comprising:
a main body having: a head with a central axis, a trough that extends outwardly in a direction substantially perpendicular to the central axis, and two cradles defined therein;
a pin body having: a pin, two axles, and a thumb-actuator nub; and
a torsion spring having a helical portion, a first end, and a second end with the helical portion slipped over one of the two axles, wherein:
the first end of the torsion spring engages with the main body;
the second end of the torsion spring rests against the thumb-actuator nub;

a first of the two axles snaps into a first of the cradles;
a second of the two axles snaps into a second of the cradles; and
the torsion spring biases the pin body toward a stowed position in which the pin of the pin body is stowed in the trough of the main body.

11. The push pin of claim 10, wherein:
the main body has a cavity defined in an underside of the main body; and
the first end of the torsion spring engages with the cavity.

12. The push pin of claim 10, wherein:
the two axles are collinear along a rotation axis; and
the thumb actuator nub is offset from the rotation axis.

13. The push pin of claim 10, wherein:
the first end of the torsion spring is straight; and
the second end of the torsion spring is hooked.

* * * * *